United States Patent [19]

Eichler et al.

[11] Patent Number: 4,687,909
[45] Date of Patent: Aug. 18, 1987

[54] APPARATUS FOR HEATING AN AIR STREAM

[75] Inventors: Walter Eichler, Steinheim; Karlheinz Färber, Giengen; Elisabeth Fischer, Kammeltal/Behlingen, all of Fed. Rep. of Germany

[73] Assignee: Bosch-Siemens Hausgeraete GmbH, Munich, Fed. Rep. of Germany

[21] Appl. No.: 737,393

[22] Filed: May 23, 1985

[30] Foreign Application Priority Data

May 23, 1984 [DE] Fed. Rep. of Germany ....... 3419267

[51] Int. Cl.4 .............................................. B01D 15/08
[52] U.S. Cl. .................................... 219/502; 219/400
[58] Field of Search ............... 219/400, 502, 364, 377, 219/503, 504

[56] References Cited

U.S. PATENT DOCUMENTS

| 2,187,613 | 1/1940 | Nichols | 219/502 |
| 2,502,844 | 4/1950 | Hildreth | 219/502 |
| 3,622,138 | 11/1971 | Kostyal | 219/502 |
| 3,781,504 | 12/1973 | Harnder | 219/502 |
| 3,882,363 | 5/1975 | Misencik | 219/502 |
| 4,420,679 | 12/1983 | Howe | 219/400 |
| 4,455,472 | 6/1984 | Moss | 219/502 |
| 4,484,064 | 11/1984 | Murray | 219/400 |
| 4,494,314 | 1/1985 | Gell | 219/502 |

FOREIGN PATENT DOCUMENTS 95038 7/1980 Japan ................................ 219/502

Primary Examiner—M. Jordan
Attorney, Agent, or Firm—Herbert L. Lerner; Laurence A. Greenberg

[57] ABSTRACT

An apparatus for heating an air current, includes a heating coil being heated until it glows providing radiation in a given region, a device for conducting an air current past the heating coil, an electronic heating power control device connected to the heating coil, and a control sensor connected to the control device in the form of a light radiation sensitive circuit element disposed in the given region.

9 Claims, 2 Drawing Figures

APPARATUS FOR HEATING AN AIR STREAM

The invention relates to an apparatus for heating an air stream, especially for coffee roasting machines, wherein coffee beans are heated and thereby roasted by air flowing through, including a heating coil which is heated to the glow region, and an air stream conducted past the heating coil.

Methods and devices for roasting coffee beans, especially small quantities of green coffee beans are known. In these conventional devices, such as is described in German Published, Non-Prosecuted Application DE-OS No. 32 17 055, the coffee beans to be roasted in the roasting chamber are whirled up by a heated air stream, which is conducted through the roasting chamber vertically from the bottom up. The coffee beans are thereby heated and roasted. The aroma content and aroma development are to a great degree dependent on the degree to which the coffee beans have been roasted. In turn, the degree of roasting results from the roasting temperature and the duration of the roasting process. In order to achieve a constant and reproduceable roasting result, it is therefore necessary to provide for the exact determination of the roasting time and to provide for a constant temperature as well. The time control can be provided without difficulty by techniques which can be taken from the existing state of the art. Temperature sensors would have to be used for holding the roasting temperature constant. Temperature sensors for suitably high temperatures and sufficiently accurate regulation characteristics are very costly. Their cost is disposed proportionately high for household roasting devices for coffee beans.

It is accordingly an object of the invention to provide an apparatus for heating an air stream, which overcomes the hereinafore-mentioned disadvantages of the heretofore-known devices of this general type, and to provide an apparatus for roasting coffee beans, especially in small quantities, through the use of an available heated air stream, which has a low manufacturing cost and yet guarantees the required temperature constancy during the roasting operation. It therefore must be considered that the temperature of the environment, the appliance temperature, the supply voltage and the different filling states are also parameters which disturb the constancy of the roasting temperature.

With the foregoing and other objects in view there is provided, in accordance with the invention, an apparatus for heating an air current, especially for coffee roasting machines, in which coffee beans are heated and roasted by an air flow, comprising a heating coil being heated until it glows providing emission or radiation in a given region, means for conducting an air current past the heating coil, an electronic heating power control device connected to the heating coil, and a control sensor connected to the control device in the form of a light radiation sensitive circuit element disposed in the given region.

An apparatus constructed according to the invention fulfills the requirements mentioned above to an outstanding degree.

In accordance with another feature of the invention, the lightsensitive circuit element is a light-dependent variable resistor (LDR).

A light-dependent variable resistance (LDR) is available at advantageous prices. The current supply of the heating coil is regulated by this circuit element in dependence on the glow-image of the heating coil, such as by using full-wave control. The image of the glowing heating coil corresponds to the air temperature with sufficient accuracy. Even different filling quantities in the roasting chamber are taken into account, because the air flow rate depends on the degree to which the roasting chamber is filled, and this in turn influences the glow-image of the heating spiral.

In accordance with a further feature of the invention, there are provided means for conducting the air current toward the heating coil, the light-sensitive circuit element being disposed in vicinity of the air current conducted toward the heating coil.

In accordance with an added feature of the invention, there is provided a light-radiation permeable cap covering the light-sensitive circuit element.

In accordance with an additional feature of the invention, there is provided a housing in which the heating coil and the light-sensitive circuit element are disposed, and an additional temperature sensor being connected to the control device and being disposed in the housing and outside the given region.

In accordance with again another feature of the invention, the temperature sensor is a temperature dependent variable resistor (NTC).

In accordance with again a further feature of the invention, the air current conducting means includes a heating channel in which the heating coil is disposed and a guide channel conducting the air current laterally into the heating channel, the guide channel including a step in vicinity of the heating coil distributing air uniformly in the heating channel In accordance with a concomitant feature of the invention, the heating power control device is in the form of a control using half-wave doses and a triac.

Other features which are considered as characteristic for the invention are set forth in the appended claims Although the invention is illustrated and described herein as embodied in an apparatus for heating an air stream, it is nevertheless not intended to be limited to the details shown, since various modifications and structural changes may be made therein without departing from the spirit of the invention and within the scope and range of equivalents of the claims The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
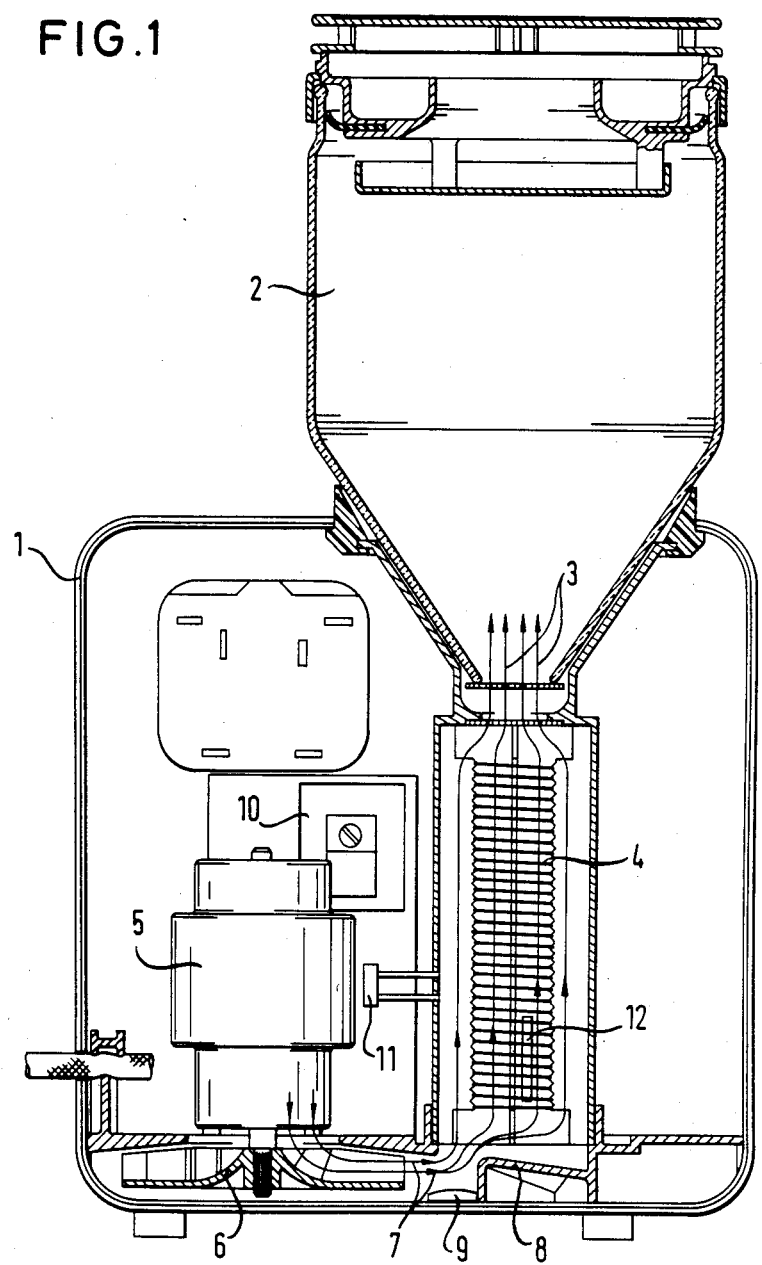
FIG. 1 is a diagrammatic, cross-sectional view illustrating the construction of a coffee roasting machine.

Referring now to the figures of the drawings in detail and first, particularly to FIG. 1 thereof, there is seen a roasting chamber 2 which is mounted onto a housing 1 of the coffee roasting machine. A hot air current 3 which is heated by a heating coil 4, is blown into the roasting chamber 2. The air current 3 is generated by a fan 6 which is driven by a motor 5. A cold air stream 7 which is sucked into the interior of the device is conducted to the heating coil 4 by the fan 6. A step 8 which is formed in the air flow channel, serves the function of distributing the air current uniformly around the heating coil 4 in the heating channel. A light-sensitive variable resistance 9 is disposed in vicinity of the air stream 7 which is conducted to the heating coil 4. The resistance 9 monitors the glow-image of the initial turns of the heating coil 4. The light-sensitive variable resistance 9 is temperature protected, and still can furnish a measured value representative of the existing air current temperature to an electronic temperature regulator 10, viewing the glow-image of the heating coil. Additionally, a temperature-dependent variable resistor 11 (NTC) which senses the temperature in the interior of the housing, is disposed in the housing. A bi-metal switch 12 is provided as an overload safety device for the heating coil.

Figure 2:
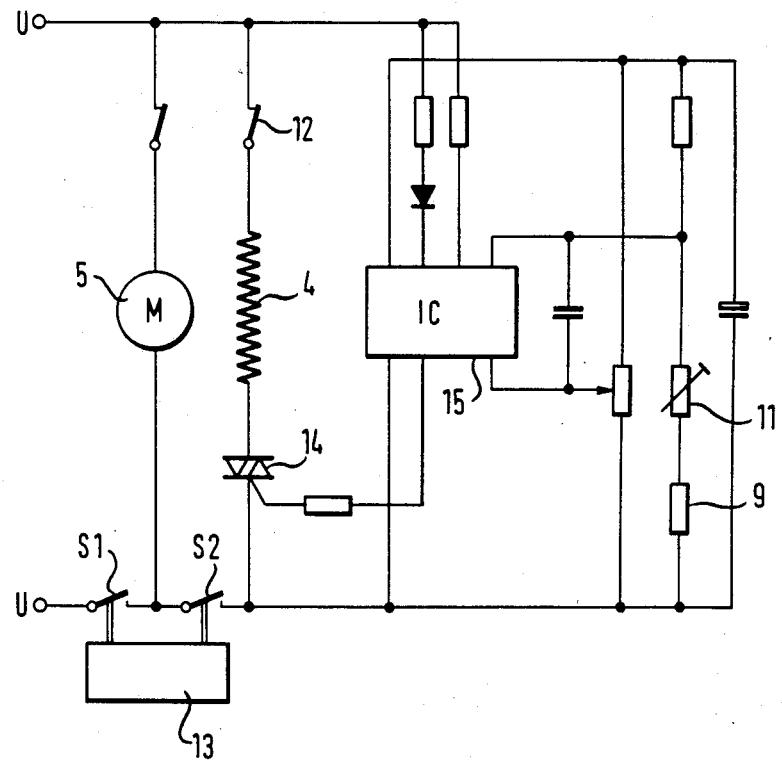
FIG. 2 is a schematic circuit diagram for the roasting machine

The circuit for operating the coffee roaster can be seen from FIG. 2. The operating current is supplied at the terminals U. Switches S1 and S2 are controlled by a timer mechanism 13. If only the switch S1 is closed, only the motor 5 is driven, which creates the air flow by means of the fan 6. When the switch S2 is also closed, the heater coil 4 and its control are also in operation. The heating current flows through a triac 14 of the regulator 10. The triac is controlled by an integrated circuit 15 of the regulator 10 with half-wave doses, units or batches or groups of cut out half waves controlling. The control criteria depends on the resistance value of the light-sensitive or light-dependent variable resistance 9 (LDR and on the resistance value of the temperature-dependent variable resistor 11.

The foregoing is a description corresponding in substance to German application No. P 34 19 267.0, filed May 23, 1984, the International priority of which is being claimed for the instant application, and which is hereby made part of this application. Any material discrepancies between the foregoing specification and the aforementioned corresponding German application are to be resolved in favor of the latter.

We claim:

1. Apparatus for heating an air current, comprising a heating coil being heated until it glows providing radiation in a given region, means for conducting an air current past the heating coil, an electronic heating power control device connected to said heating coil, and a control sensor connected to said control device in the form of a light radiation sensitive circuit element disposed in said given region.

2. Apparatus according to claim 1, including means for conducting the air current toward said heating coil, said light-sensitive circuit element being disposed in the air current conducted toward said heating coil.

3. Apparatus according to claim 1, including a light-radiation permeable cap covering said light-sensitive circuit element.

4. Apparatus according to claim 1, wherein said light-sensitive circuit element is a light-dependent variable resistor (LDR).

5. Apparatus according to claim 1, including a housing in which said heating coil and said light-sensitive circuit element are disposed, and a temperature sensor being connected to said control device and being disposed in said housing and outside said given region.

6. Apparatus according to claim 5, wherein said temperature sensor is a temperature dependent variable resistor (NTC).

7. Apparatus according to claim 1, wherein said air current conducting means includes a heating channel in which said heating coil is disposed and a guide channel conducting the air current laterally into said heating channel, said guide channel including a step in vicinity of said heating coil distributing air uniformly in said heating channel.

8. Apparatus according to claim 1, wherein said heating power control device is in the form of a control using half-wave doses and a triac.

9. Apparatus according to claim 1, wherein said radiation sensitive circuit element monitors said radiation.

* * * * *